Aug. 14, 1934.                J. F. HIGBEE                    1,970,378
              VEHICLE SUPPORTING DUAL WHEEL ASSEMBLY
                      Filed May 17, 1930         3 Sheets-Sheet 3
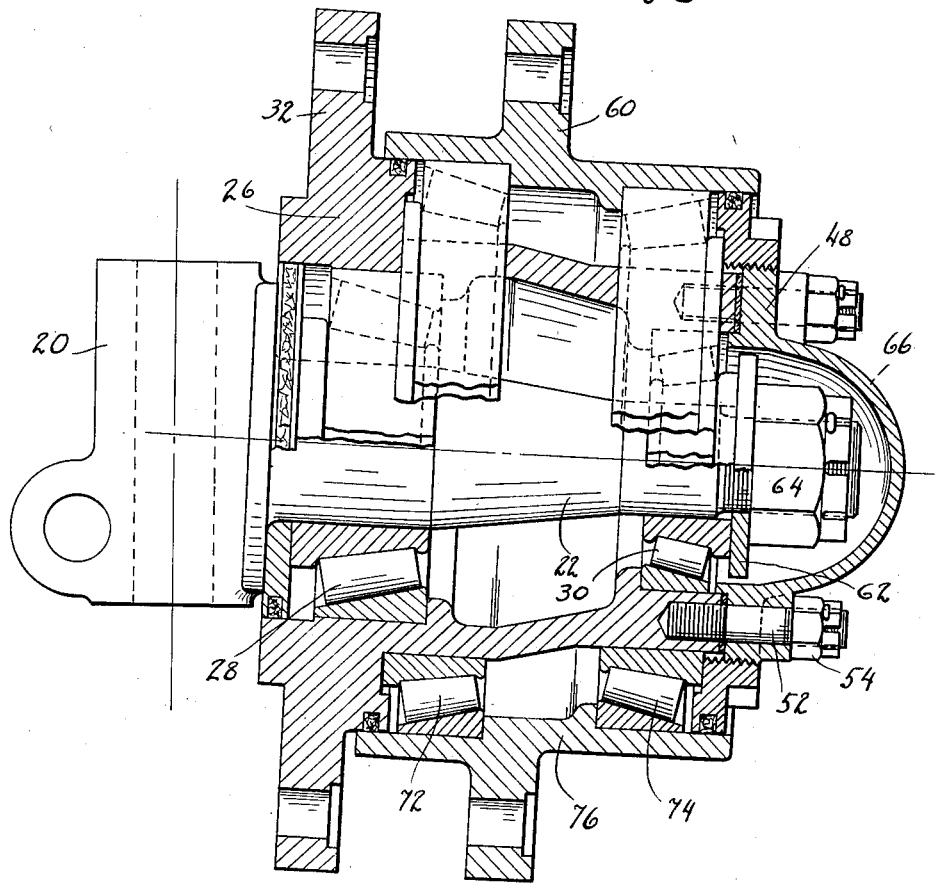
INVENTOR.
James F. Higbee
BY
Parker & Burton
ATTORNEYS Patented Aug. 14, 1934

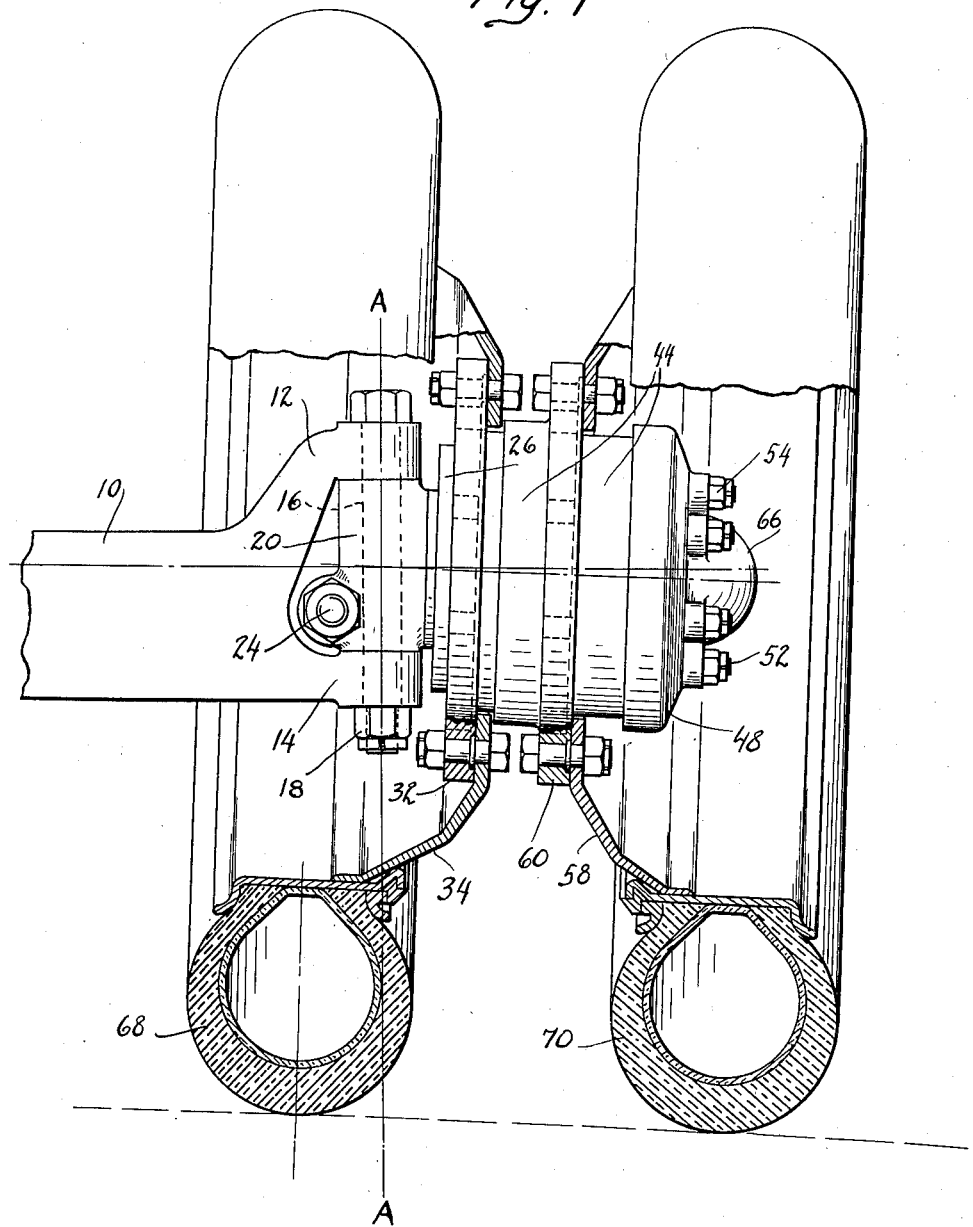

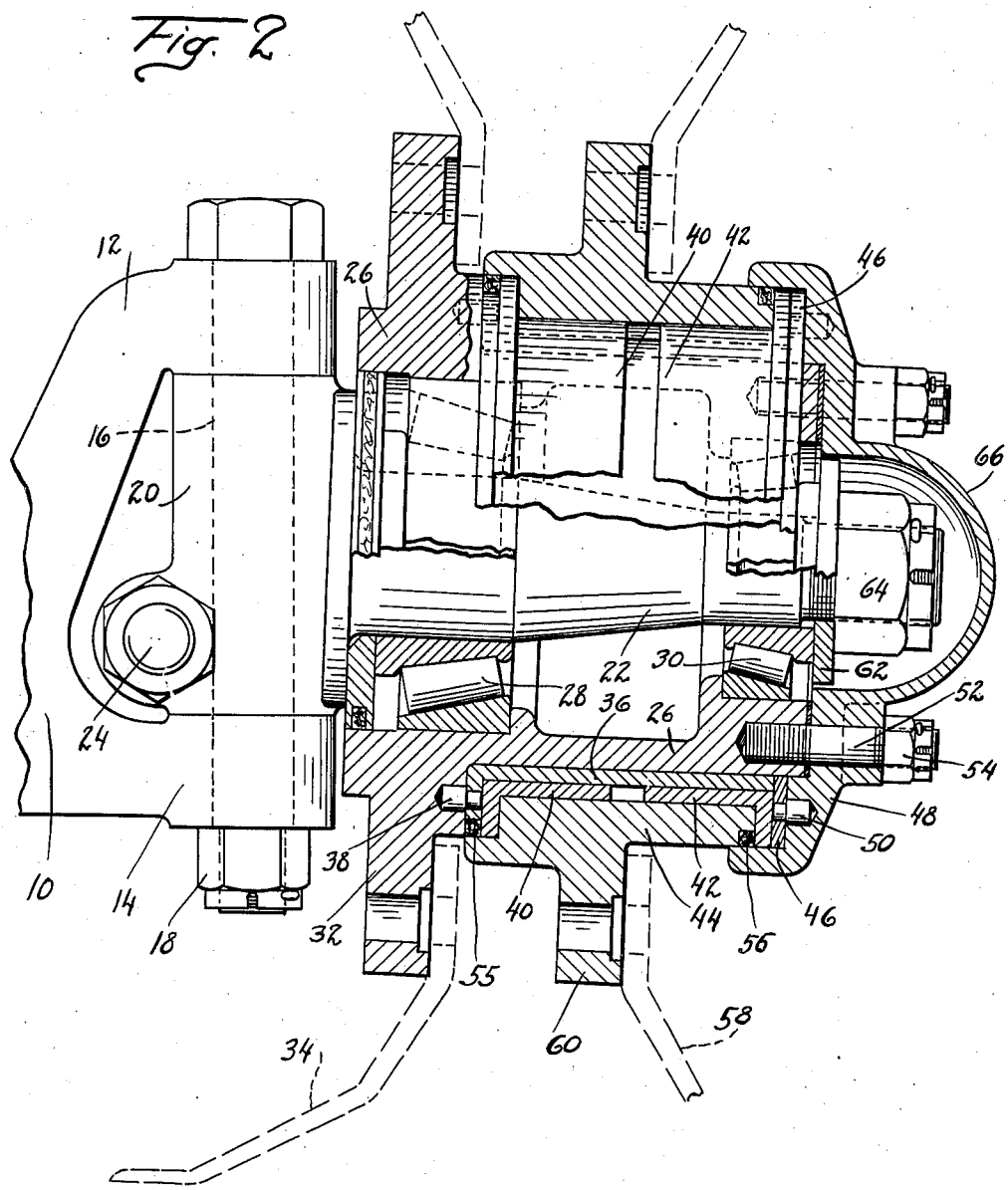

1,970,378

UNITED STATES PATENT OFFICE

1,970,378

VEHICLE SUPPORTING DUAL WHEEL ASSEMBLY

James F. Higbee, Detroit, Mich., assignor, by mesne assignments, of one-half to Edith R. Panabaker, Harrow, Ontario, Canada, as trustee Application May 17, 1930, Serial No. 453,373

1 Claim. (Cl. 280—96.1)

My invention relates to vehicle supporting wheel assemblies and has particular reference to that type wherein a plurality of ground engaging wheels, or wheel elements including ground engaging portions, are provided at each end of an axle and preferably mounted upon a single spindle.

In the conventional type of dual wheel assembly, and particularly where they are utilized upon a swivelled or steerable front wheel spindle, the wear upon the tires mounted upon the respective wheels differs considerably. Furthei more, the conventional dual wheel assembly is difficult to steer because of the fact that the outer tire has a tendency to travel more rapidly than the inner one during a turning operation. Due to the slippage upon the ground caused by the two wheel elements traveling over different arcs the wear on the outer tire is markedly greater than that on the inner. This difficulty is encountered on all dual wheel assemblies inasmuch as the outer wheel always tends to rotate more rapidly on a turn than the inner wheel, whether it is the steering wheel assembly or not.

Still another cause of undue wear in vehicle supporting dual wheel assemblies is the fact that one tire is apt to become less inflated than the other, thereby decreasing its effective radius, and this tends to make one wheel rotate faster than its mate. Again, since in the conventional type of wheel assembly the two wheels are mounted in such a way that they are forced to rotate in unison this difference in the inflation of the two tires will cause undue wear upon the one which is inflated to the greater pressure.

Still a further difficulty encountered by virtue of the substantially integral construction of the conventional dual wheel assembly resides in the fact that the two inner wheels usually take a greater proportion of the vehicle load than the outer wheels because of the crown in the road. This results in the inner tire taking on a smaller diameter than the outer and the consequent aforesaid tendency to rotate more rapidly than the outer wheel. Again the result is slippage of the outer tire upon the road, causing unnecessary wear.

A prime desideratum of my invention is to eliminate the difficulties listed above by an improved type of dual wheel assembly which eliminates the cause of the undue wear upon the tire. By so mounting the two wheels of my assembly that each is journalled to permit it to rotate independently of the other, one wheel may rotate slightly more rapidly or more slowly than the other and slippage of the tire surface on the road is avoided.

In designing this improved assembly, I contemplate particularly utilizing it upon a swivelled steering spindle for trailer vehicles, and it is desirable that the assembly be so designed that the road engaging tire portions of the wheel assembly be close together and that the outer wheel be not too distant from the swivelling axis of the assembly. If the outer wheel is located at a substantial distance from the swivel axis the moment arm thereby created would cooperate with the resistance of the road engaging tire to render steering of the vehicle difficult.

These and other objects are obtained in my improved construction which will be more clearly understood from the following description taken in conjunction with the drawings wherein like numerals refer to like figures and wherein:

Fig. 1 is an elevation of my improved assembly, partly in section,

Fig. 2 is a section through the axial center of my hub assembly, and

Fig. 3 is a modification of Fig. 2.

Although I do not contemplate using this improved structure only on the swivelled spindle of a vehicle, I have so illustrated it in the drawings, wherein the axle 10 is provided with the conventional bearing arms 12 and 14 in which is secured the king pin 16 by means of the lock nut 18. The knuckle 20 is journalled upon the king pin as illustrated and the spindle 22 is integral therewith. The spindle is rotated about its axis by means of a connection, as at 24, with the steering knuckle 20.

The inner wheel hub 26 is journalled upon the spindle for rotation in respect thereto by means of inner and outer bearings 28 and 30 respectively. This hub is provided with a radial flange 32 to which the disc 34 of a disc wheel may be secured as indicated in the drawings. A hardened steel sleeve 36 surrounds a portion of the hub 26 and is secured thereto adjacent the flange portion 32 thereof by means of a plurality of dowels 38. Surrounding the steel sleeve 36 is another hardened steel sleeve 40 which, together with a similarly shaped steel sleeve 42 around the outer extremity of sleeve 36, constitutes a bearing surface for the hub 44 of the second wheel of the assembly.

A wear plate 46 is secured to the hub cap member 48 by means of a plurality of dowel pins 50 and the hub cap is secured to the inner hub member 26 by means of the bolts 52 and lock nuts 54.

Washer rings 55 and 56 prevent the dirt and grease from entering into the bearing surfaces of the outer hub 44. The disc 58 of the outer wheel is secured to the flange 60 of outer hub 44 as indicated. The bearing assembly for bearings 28 and 30 are secured in assembled position by means of the washer 62 and reversely threaded lock nut 64 which extends within the dome shaped portion 66 of the hub cap 48.

It is apparent from inspection of Figs. 1 and 2 that the road engaging surfaces or the tires 68 and 70 of this dual wheel assembly are relatively closely spaced and that the swivelling axis of the assembly, indicated by the line A—A, lies intermediate these road engaging surfaces.

In Fig. 3 I have illustrated a somewhat modified form of assembly wherein roller bearings 72 and 74 are provided for the outer hub 76. The remaining structure of this figure is substantially like that of Figs. 1 and 2 and it is not believed that any further elaboration is necessary.

Obviously the rotation of either one of the wheels of the dual assembly with respect to the other one will be slight at greatest. Nevertheless it has been found by experience that the provision of a structure whereby such independent relative rotation is possible saves a great deal of wear upon the tires and renders the steering of such front wheel dual assemblies more effortless.

Various other modifications will be apparent to those skilled in the art and for that reason I intend to limit myself only within the scope of the appended claim.

What I claim:

A swivelled dual wheel assembly for a vehicle comprising, in combination with an axle provided with a swivelled spindle, dual wheels mounted upon said spindle for independent rotation, said spindle having a swivelling axis arranged substantially within the upright plane of the inner wheel but at an angle thereto so that the line of projection of the swivelling axis contacts the ground between the points of contact of the two wheels with the ground.

JAMES F. HIGBEE.